March 31, 1925. 1,531,481
G. HAISS
WAGON LOADER
Filed Jan. 22, 1924 2 Sheets-Sheet 1

Inventor
George Haiss
By his Attorneys
Williams & Pritchard

March 31, 1925.
G. HAISS
WAGON LOADER
Filed Jan. 22, 1924    2 Sheets-Sheet 2
1,531,481
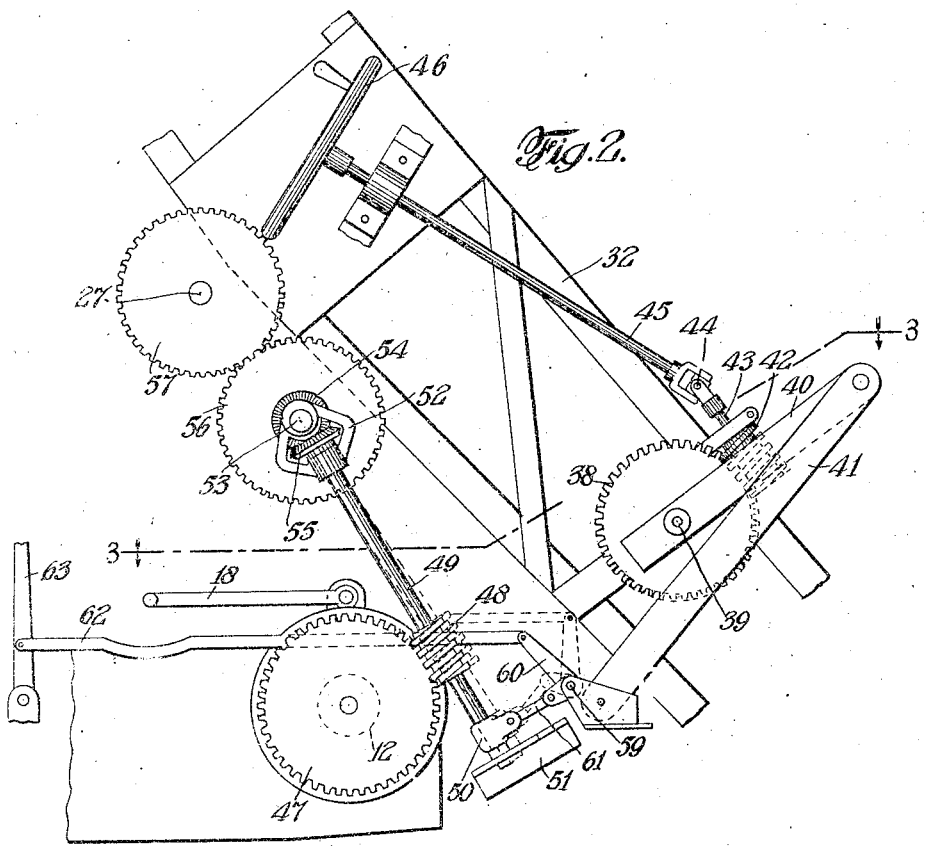
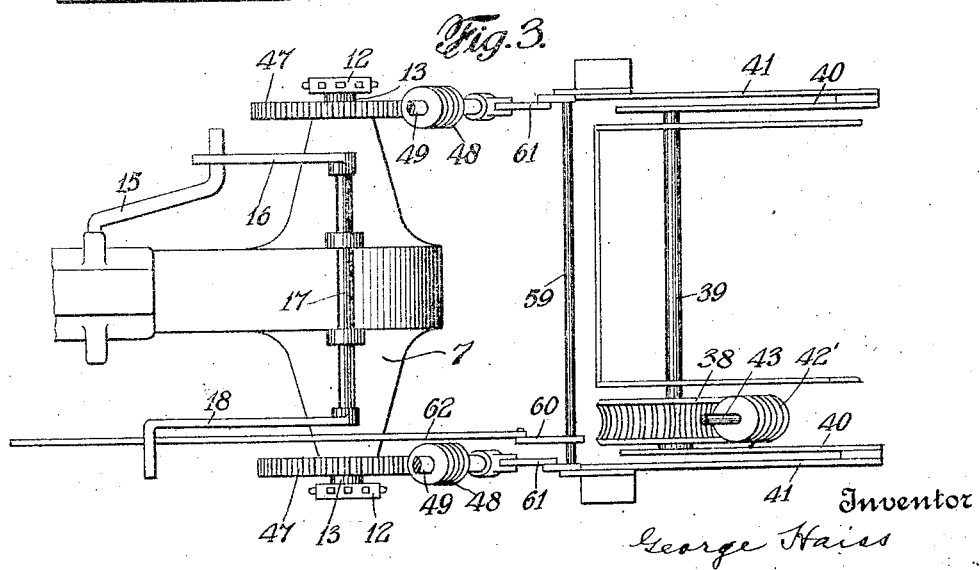
Inventor
George Haiss
By his Attorneys
Williams & Pritchard Patented Mar. 31, 1925.

1,531,481

UNITED STATES PATENT OFFICE.

GEORGE HAISS, OF NEW YORK, N. Y.

WAGON LOADER.

Application filed January 22, 1924. Serial No. 687,681.

*To all whom it may concern:*

Be it known that I, GEORGE HAISS, a citizen of the United States, and a resident of the borough of Bronx, city of New York, county of Bronx, and State of New York, have invented certain new and useful Improvements in Wagon Loaders, of which the following is a specification.

This invention relates to wagon loaders of the power operated type using as a power plant the power unit of a well known type of tractor known as "Fordson" so connected or incorporated into the mechanism as to enable the same to be used as a means for propelling or transporting the machine from place to place, for facilitating operation of the elevating conveyor, for driving the rotatable digging elements located at the rear of the machine and for effecting a creeping movement of the machine towards and into the material to be loaded as the path of travel is cleared by the action of the digging elements and the material elevated through the instrumentality of the conveyor.

One of the primary objects of my invention is to so construct and incorporate into a machine of the character mentioned certain improved elements which will generally improve the machine in its entirety rendering the same more reliable in its operation and enabling the machine to be more easily controlled under all conditions incident to its operation.

Other objects and certain advantages of the invention will become apparent from the following description when taken in connection with the accompanying drawings in which—

Figure 2 is a fragmental view in elevation of a portion of the machine showing more or less in detail the novel construction and arrangement of certain operating and control units.

Figure 3 is a horizontal sectional view taken on line 3—3 of Figure 2.

Figure 1:
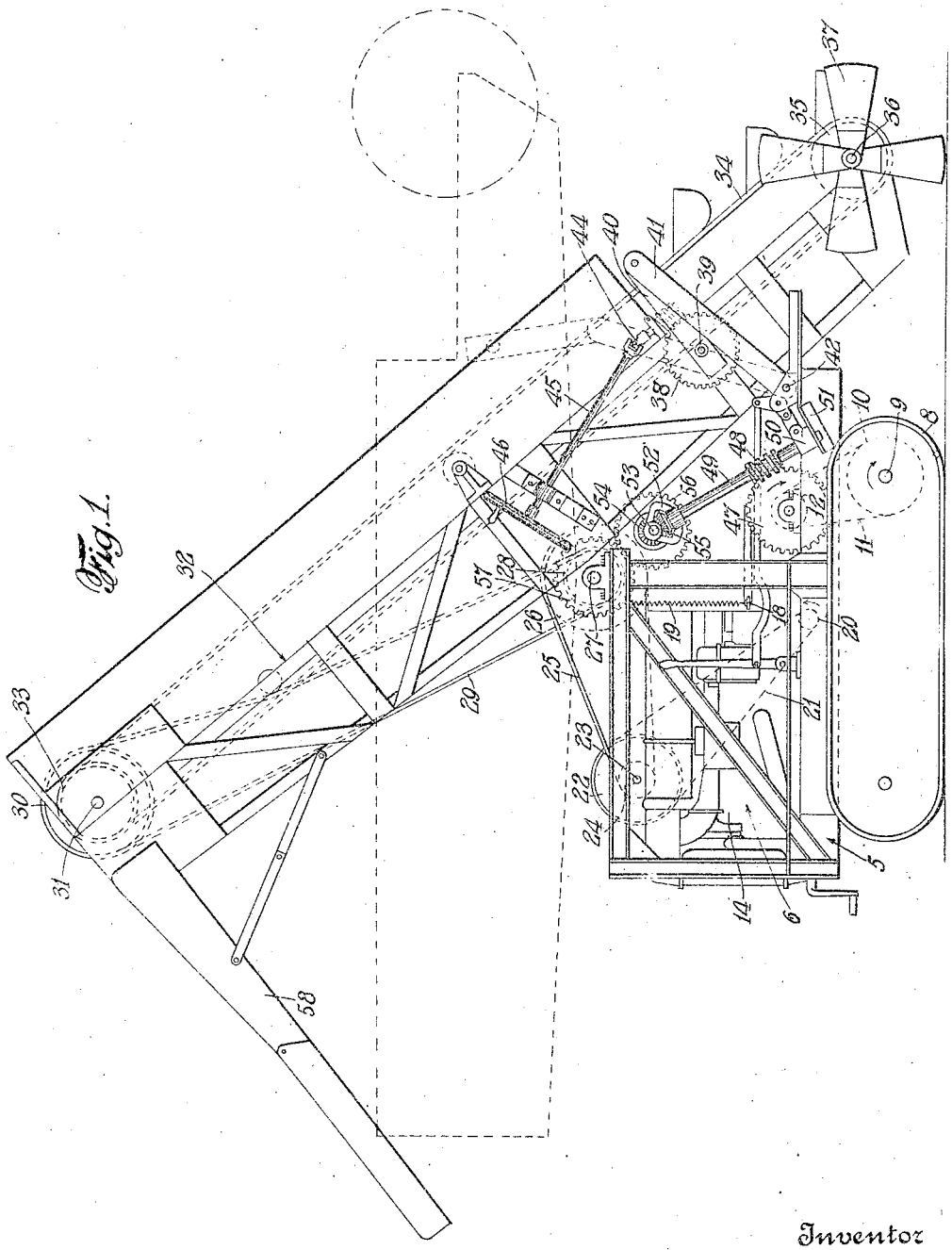
Figure 1 is a side elevation of the machine embodying my invention.

In the drawings wherein for the purpose of illustration is shown what I at present consider the preferred form of my invention, the numeral 5 indicates a suitable frame adapted for the reception of a power plant 6 herein disclosed as that of the well known Fordson tractor employing the usual differential and axle housing 7. The power plant of the type mentioned is rendered particularly adapted for use in connection with the machine embodying my invention by removing the wheels, both steering and traction, and substituting for the latter a pair of sprockets 12 which are suitably connected to the outer ends of the tractor axles 13 and operatively connected to a traction device 8, of the caterpillar type, to the driving axle 9 of which is connected a pair of sprockets, one of which is indicated by the numeral 10. The sprockets 10 are, by means of sprocket chains 11, connected to the sprockets 12 which are adapted to be operatively connected with the tractor engine 14 through the instrumentality of a suitable clutch, not shown, which is controlled by means of a clutch arm or crank 15 adapted to cooperate with a lever 16 connected to a shaft 17 journaled to the housing 7 and carrying at its opposite end a foot lever 18. This foot lever is adapted to be depressed when it is desired to operatively connect the axles 13 with the tractor engine 14 as will be readily understood by those skilled in the art to which my invention pertains. When it is desired to release the operative connection established between the tractor engine 14 and the axle 13 the clutch is released by moving the foot from the lever 18 whereupon the lever 16 is retracted or lifted under the influence of a tension spring 19 one end of which is connected to the lever 18 whereas its opposite end is connected to a suitable part of the frame 5. Although not shown it will be readily appreciated that suitable steering mechanism may be employed in the form of brakes adapted to cooperate with the axles 13 in such a way that one of the axles may be retarded in its rotation and yet permit the other axle to rotate by reason of the presence of a suitable differential gearing housed within the casing 7 but not disclosed herein.

The power unit 6 is provided with a suitable power take-off sprocket 20 adapted to be driven from the engine crank shaft, not shown, and disengaged therefrom when desired through the instrumentality of a suitable clutch mechanism not shown. This take-off sprocket is operatively connected by means of a sprocket chain 21 to a sprocket 22 carried by a shaft 23 journaled to and supported by the frame 5. The shaft is in turn provided with a similar sprocket 24 operatively connected by means of a sprocket chain 25 to a sprocket 26 carried by a shaft 27 supported by and suitably journaled to the frame 5. This shaft carries a sprocket 28 operatively connected by means of a sprocket chain 29 to a conveyor operating sprocket 30 connected to a suitable shaft 31 journaled to the upper end of a conveyor frame 32 pivotally connected to the frame 5 and adapted to be moved through the instrumentality of mechanism hereinafter more clearly described from its full line position shown in Figure 1 to its dotted line position or vice versa. The shaft 31 is provided with suitable conveyor sprockets 33 over which passes an endless conveyor 34 operatively connected at the lower end of the frame 32 to sprockets 35 connected to a transversely disposed shaft 36. This shaft at each end extends an appreciable distance to each side of the path of travel of the conveyor and is provided with a plurality of digging elements 37 having faces so inclined as to feed the material inwardly towards the conveyor, the shaft 36 being so rotated that the digging elements 37 impart rearwardly and upwardly directed impacts to the material to be loaded thus tending to loosen the same so that the digging elements may thereafter readily act upon it to direct it inwardly towards the conveyor.

When the machine in its entirety is being transported from place to place it is desirable that the frame 32 be maintained in its dotted line position shown in Figure 1 and in order to facilitate the movement of this frame I have provided a novel form of raising and lowering mechanism adapted to be manually operated and comprising a worm gear 38 connected to a transversely disposed shaft 39 suitably journaled to the frame 32. To this shaft is rigidly connected a pair of arms 40 which at their outer ends are pivotally connected to a pair of upwardly extending links 41 which at their lower ends are pivotally connected as shown at 42 to a suitable part of the frame 5. Meshing with the worm gear 38 is a worm 42 carried by a shaft 43 suitably journaled to the frame 32. This shaft at one end is provided with a universal joint 44, one member of which is carried at the lower end of a manually operated shaft 45 journaled to the frame 32 and provided at its upper end with a hand wheel 46. By rotating the hand wheel 46 in one direction the worm gear 38 is so rotated as to cause the arms 40 and links 41 to move relative to each other thereby lifting and lowering respectively opposite ends of the frame 32 and thereby moving the same about its pivotal connection with the frame 5 to the dotted line position shown in Figure 1. When it is desired to move the frame 32 from its dotted line position to its full line position shown in Figure 1 the hand wheel 46 is, of course, rotated in an opposite direction.

A slow or gradual crowding or creeping movement of the machine toward and into the pile of material to be loaded is effected by means of a novel form of gearing comprising a pair of worm gears 47 carried by and secured to the outer ends of the axle 13. These gears are in turn adapted to mesh with worms 48 carried by upwardly extending inclined shafts 49, the lower ends of which are journaled within movable bearings 50 adapted to slide within guide blocks 51 carried by and suitably supported on the frame 5. The upper ends of the shafts 49 are journaled within yokes 52 which are in turn journaled to a transversely disposed shaft 53 suitably supported by the frame 5. This shaft carries a pair of beveled gears 54 which are adapted to mesh with similar beveled gears 55 secured to the shafts 49 at their upper ends. Rotation of the shaft 53 is effected through the instrumentality of a spur gear 56 carried by the shaft 53 and maintained in driving engagement with a similar spur gear 57 secured to the shaft 27. When the clutch, not shown, controlling the operation of the take-off sprocket 20 is so operated as to effect rotation of this sprocket the shaft 27 is rotated through the instrumentality of the sprocket chains 21 and 25 and the sprocket wheels 22, 24 and 28. Rotation of the shaft 49 is thus effected and the worm wheels 47 meshing with the worms 48 are caused to rotate in a clockwise direction as viewed in Figure 1 thereby causing the traction device 8 through the instrumentality of the sprockets 10 and 12 and the intermediate sprocket chains 11 to effect, through this system of reduction gearing, a slow or creeping movement of the machine in its entirety towards and into the pile of material to be loaded. Upon such movement the digging elements 37 impart rearwardly and upwardly directed impacts to the material causing the same to move slightly forward with respect to the travel of the machine and into the path of the conveyor 34 which collects the same and carries it upwardly depositing it finally upon an inclined chute 58 from which it is directed into a wagon or other designed vehicle. When it is desired to discontinue this creeping or crowding action of the machine the worms 48 are disengaged from their respective worm wheels 47. Such disengagement may be effected without discontinuing the operation of the conveyor 34 thus permitting the machine to continue in its operation in so far as the conveyor is concerned without undergoing further movement towards or into the pile of material to be loaded. In order to effect this disengagement between the worms 48 and their respective worm wheels 47 I provide a transversely disposed shaft 59 suitably journaled to and supported by the frame 5. To this shaft is rigidly connected a pair of bell crank levers 60 which are in turn connected to links 61 pivotally connected to the movable journals 50. One of the levers is connected to a longitudinally disposed operating rod 62 pivotally connected to a manually operated upright lever 63 pivoted at its lower end to the frame 5. By moving this lever in one direction the links 61 are lifted from their full line position shown in Figure 2 to their dotted line position thus causing the journals 50 to move from their full line position shown in Figure 2 to their dotted line positions, the journals 50 being guided or permitted to slide within their respective guides 51. By so operating the lever 63 the worms 48 are lifted from engagement with respect to the worm wheels 47 thus discontinuing the crowding or creeping movement of the machine in its entirety without affecting the operation of the conveyor 34. When it is desired to reestablish this creeping motion the lever 63 is moved in an opposite direction thus causing the links 61 to move from their dotted line position shown in Figure 2 to their full line position and thereby reestablish driving engagement between the worms 48 and worm wheels 47.

It will, of course, be appreciated that in order to prevent stripping of gears when the loader in its entirety is being transported from place to place, as for example when the engine 14 is coupled to the axles 13 through the instrumentality of the clutch, not shown, the worms 48 must necessarily be disengaged from the worm gears 47, such disengagement being readily effected through the instrumentality of the lever 63 and the several cooperating elements associated therewith, as above described.

It will be appreciated from the foregoing that the machine embodying my invention employs a main driving means which includes both the tractor power plant and a substitute traction device driving means in the form of sprockets 12 substituted for the usual tractor traction or driving wheels not shown. The main driving means is employed when transporting the machine from place to place but when moving the machine gradually into a pile of material to be loaded an auxiliary driving means is relied upon which includes the worm gears 47, worms 48 and such other elements, hereinbefore described, as are necessary to operatively connect the worms 48 with the power plant through the take-off sprocket 20. This auxiliary driving means, it will be appreciated, is adapted to cooperate directly with the substitute traction device driving means namely, the sprockets 12 when the machine is being slowly moved or crowded into a pile of material to be loaded.

While I have shown and described what I at present consider the preferred form of my invention it is to be understood that various changes as to size, arrangement and proportion of elements may be resorted to without departing from the spirit of the invention or the scope of the subjoined claims.

Having thus described my invention I claim:

1. In a wagon loader an elevator; a traction device; main driving means adapted to drive said traction device and including a tractor power plant and substitute traction device driving means substituted for the traction wheels of the tractor; and auxiliary driving means adapted to connect the tractor power plant and said traction device through said substitute traction device driving means and to cooperate with said substitute traction device driving means for effecting a relatively slow traction movement of the loader.

2. In a wagon loader an elevator; a traction device; main driving means adapted to drive said traction device and including a tractor power plant and substitute traction device driving means substituted for the traction wheels of the tractor; auxiliary driving means adapted to connect the tractor power plant with said traction device through said substitute traction device driving means and to cooperate with said substitute traction device driving means for effecting a relatively slow traction movement of the loader; and means for discontinuing the driving effect of said auxiliary driving means.

3. In a wagon loader an elevator; a traction device; main driving means adapted to drive said traction device and including a tractor power plant and substitute traction device driving means substituted for the traction wheels of the tractor; auxiliary driving means adapted to connect the tractor power plant with said traction device through said substitute traction device driving means and to cooperate with said substitute traction device driving means for effecting a relatively slow traction movement of the loader; and separately controlled devices for connecting said power plant to said traction device respectively through said substitute traction device driving means alone and through said substitute traction device driving means and auxiliary driving means collectively.

4. In a wagon loader an elevator; a traction device; main driving means adapted to drive said traction device and including a tractor power plant and substitute traction device driving means substituted for the traction wheels of the tractor; auxiliary driving means adapted to connect the tractor power plant with said traction device through said substitute traction device driving means and to cooperate with said substitute traction device driving means for effecting a relatively slow traction movement of the loader; means for disconnecting said power plant from said traction device through said substitute traction device driving means; and means for disconnecting said power plant from said traction device through said auxiliary driving means and substitute traction device driving means.

5. In a wagon loader an elevator; a traction device; main driving means adapted to drive said traction device and including a tractor power plant and substitute traction device driving means substituted for the traction wheels of the tractor; a shaft operatively connected to said traction device and to said substitute traction device driving means; and auxiliary driving means adapted to cooperate with said substitute traction device driving means for effecting a relatively slow traction movement of the loader.

6. In a wagon loader an elevator; a traction device; main driving means adapted to drive said traction device and including a tractor power plant and substitute traction device driving means substituted for the traction wheels of the tractor; a shaft operatively connected to said traction device and said substitute traction device driving means; and auxiliary driving means adapted to cooperate with said substitute traction device driving means for effecting a relatively slow traction movement of the loader, said auxiliary driving means comprising a driven element adapted to be moved into and out of engagement with said substitute traction device driving means whereby said power plant is connected to and disconnected from said traction device through said auxiliary driving means.

7. In a wagon loader an elevator; a traction device; main driving means adapted to drive said traction device and including a tractor power plant and substitute traction device driving means substituted for the traction wheels of the tractor; a shaft connected to said traction device and operatively connected to said substitute traction device driving means; and auxiliary driving means adapted to cooperate with said substitute traction device driving means for effecting a relatively slow traction movement of the loader, said auxiliary driving means comprising gears substituted for the traction wheels of the tractor, and cooperating driving means adapted to be moved into and out of engagement with said gears whereby said power plant is operatively connected to and disconnected from said traction device through said auxiliary driving means.

8. In a wagon loader an elevator; a traction device; main driving means adapted to drive said traction device and including a tractor power plant and substitute traction device driving means substituted for the traction wheels of the tractor; a shaft connected to said traction device and operatively connected to said substitute traction device driving means; and auxiliary driving means adapted to cooperate with said substitute traction device driving means for effecting a relatively slow traction movement of the loader, said auxiliary driving means comprising worm gears substituted for the traction wheels of the tractor, worms adapted to engage said gears, shafts carrying said worms, a train of gear operatively connected to the latter named shafts and to said power plant, and means for moving said worms into and out of engagement with the first mentioned gears.

9. In a wagon loader an elevator; a traction device; main driving means adapted to drive said traction device and including a tractor power plant and substitute traction device driving means substituted for the traction wheels of the tractor; a shaft connected to said traction device and operatively connected to said substitute traction device driving means; and auxiliary driving means adapted to cooperate with said substitute traction device driving means for effecting a relatively slow traction movement of the loader, said auxiliary driving means comprising worm gears substituted for the traction wheels of the tractor, worms adapted to engage said gears, shafts carrying said worms, a train of gear operatively connected to the latter named shafts and to said power plant, means for moving said worms into and out of engagement with the first mentioned gears, and means for guiding said worms in their respective paths of travel when being moved into and out of engagement with the first mentioned gears.

In testimony whereof, I have affixed my signature to this specification.

GEORGE HAISS.